No. 794,427. PATENTED JULY 11, 1905.
D. SCHMUTZ.
DOUBLING AND TWISTING MACHINE.
APPLICATION FILED JAN. 30, 1904.
2 SHEETS—SHEET 1.
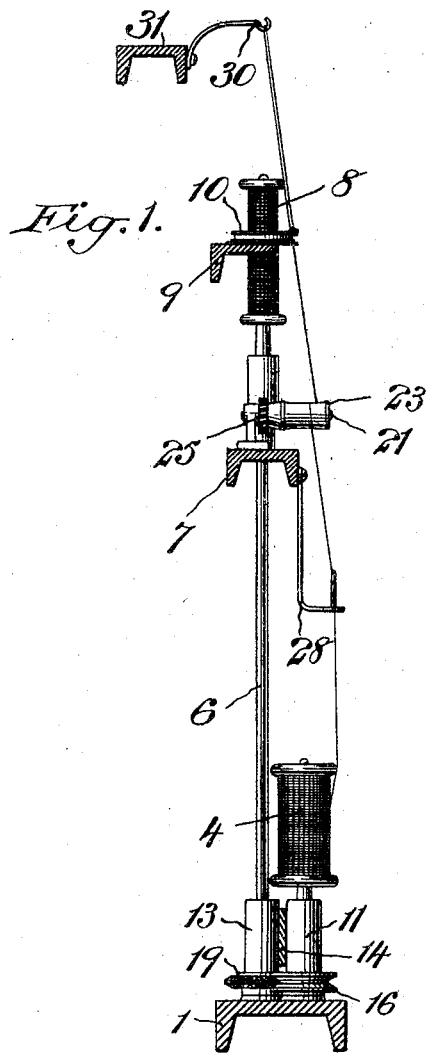
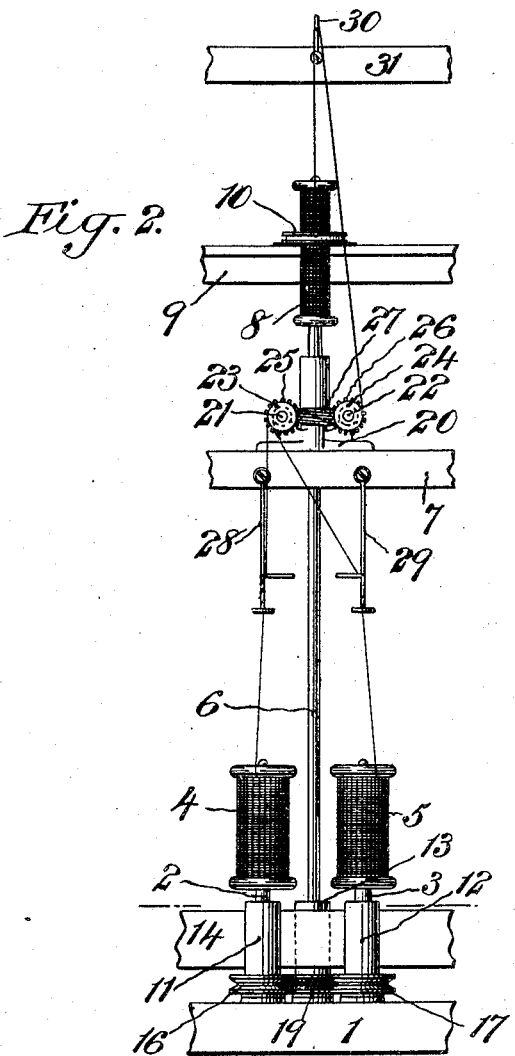
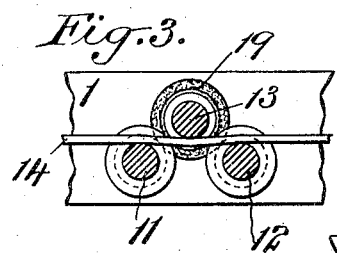
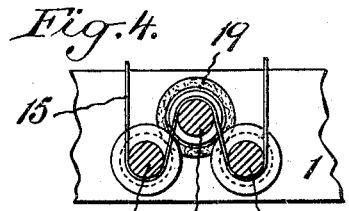
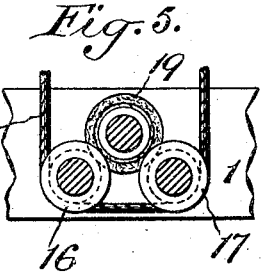
Witnesses:
F. George Barry
Henry Theme
Inventor:
David Schmutz
by attorneys

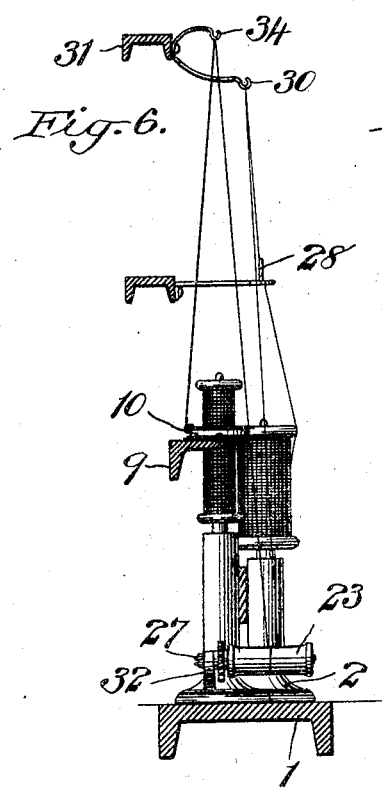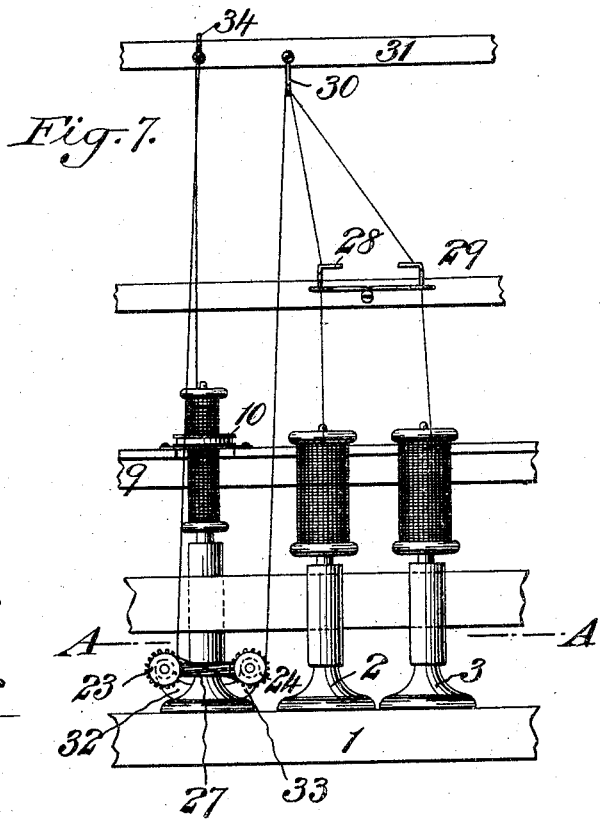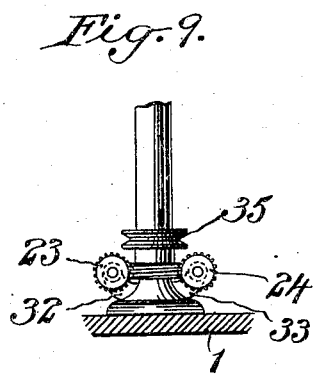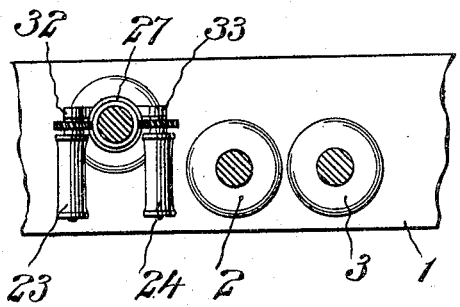

No. 794,427. Patented July 11, 1905.

UNITED STATES PATENT OFFICE.

DAVID SCHMUTZ, OF PATERSON, NEW JERSEY.

DOUBLING AND TWISTING MACHINE.

SPECIFICATION forming part of Letters Patent No. 794,427, dated July 11, 1905.

Application filed January 30, 1904. Serial No. 191,273.

*To all whom it may concern:*

Be it known that I, DAVID SCHMUTZ, a citizen of the United States, and a resident of Paterson, in the county of Passaic and State of New Jersey, have invented a new and useful Improvement in Doubling and Twisting Machines, of which the following is a specification.

My invention relates to an improvement in doubling and twisting machines, and has more particularly for its object to provide a device in which the thread friction-roll is positively driven at a predetermined speed with reference to the speed of its receiving-spindle.

A further object is to provide the delivery and receiving spindles with means for the engagement of a horizontal longitudinal belt-drive, a cord or rope drive, or a transverse band-drive.

In the accompanying drawings I have represented only as much of a doubling and twisting machine as will give a clear understanding of my invention.

Figure 1 is a vertical transverse section through a portion of a doubling and twisting machine with my improvement applied thereto, one set only of delivery and receiving spindles being shown. Fig. 2 is a front view of the same. Fig. 3 is a detail horizontal section showing the spindles driven by a longitudinal horizontal belt. Fig. 4 is a similar view showing the spindles driven by a horizontal transverse band. Fig. 5 is a similar view showing the spindles driven by a horizontal transverse rope or cord. Fig. 6 is a vertical transverse section through a portion of a doubling and twisting machine with my improvement applied thereto, showing a modified form of arrangement of the delivery and receiving spindles. Fig. 7 is a front view of the same. Fig. 8 is a horizontal section in the plane of the line A A of Fig. 7 looking to the base of the machine; and Fig. 9 is a detail front view of the base of the receiving-spindle, showing the same provided with a whirl on the drum for the reception of a cord or rope drive.

Referring to Figs. 1 to 5, inclusive, the spindle-rail is denoted by 1, upon which rail are suitably mounted the delivery-spindles 2 3, carrying the delivery-bobbins 4 5. The receiving-spindle is mounted in the spindle-rail 1 and is shown herein as extending upwardly to a point considerably above the delivery-spindles 2 3 and passing through an upper rail 7. The bobbin upon the receiving-spindle 6 is denoted by 8. The usual ring-rail 9 is located adjacent to the bobbin 8, its ring 10 surrounding the bobbin. This rail may be moved up and down in the usual manner by any desired means. (Not shown herein.) Adjacent to the spindle-rail 1 the delivery-spindles 2 3 are provided with drums 11 12, and the receiving-spindle 6 is provided with a drum 13, arranged to be engaged either by the usual longitudinally-extended horizontal driving-belt 14, as shown in Figs. 1, 2, and 3, or the transverse horizontal band 15, as shown in Fig. 4. The delivery-spindles 2 and 3 are further provided with whirls 16 17 for the reception of a horizontally-disposed transverse cord or rope 18, as clearly shown in Fig. 5. The utmost accuracy of corresponding speed in rotation between the delivery and receiving spindles is obtained by providing the receiving-spindle 6 with a friction-disk 19, of leather or other suitable material, which is engaged with the grooves in the whirls 16 17 of the delivery-spindles. It will thus be seen that the spindles are fitted to be driven by a longitudinal horizontal driving-belt, a transverse horizontal driving-band, or a transverse horizontal driving cord or rope, as may be found most convenient. On the rail 7 is mounted a bracket 20, which supports stud-axles 21 22 of thread friction-rolls 23 24, extending transverse to the axis of the receiving-spindle 6. These friction-rolls 23 24 are provided with gears 25 26, which mesh with a worm 27, fixed to the spindle 6. The diameters of these rolls and the pitch of the worm are such that the rolls will be rotated at a predetermined speed with respect to the speed of rotation of the receiving-spindle, so that the thread as delivered from the friction-rolls will be wound onto the receiving-bobbin 8. Thread-tension devices 28 29 of the usual form are secured to the rail 7. The threads are led from the delivery-bobbins 4 and 5 through the tension devices 28 29 around the friction-roll 23, from thence around the friction-roll 24, from thence around a hook 30, fixed to the top rail 31, and from thence to the ring 10. The doubling and twisting of the two threads is performed as usual between the friction-rolls and the receiving-bobbin.

In the forms represented in Figs. 6, 7, and 8 the spindles are arranged in a slightly different form and the friction-rolls placed in a different location; but the operation of the mechanism is substantially the same. In this form the worm 27 is secured to the receiving-spindle near the rail 1, and the friction-rolls 23 24 are mounted in brackets 32 33 at the base of the said spindle. In this form after the threads leave the tension devices 28 29 they lead to the hook 30 on the top rail 31, from thence to the friction-rolls 23 24, from thence to a second hook 34 on the top rail 31, and from thence to a ring 10 on the ring-rail 9.

In Fig. 9 I have shown the receiving-spindle as provided with a whirl 35.

By the arrangement hereinabove set forth it is seen that the spindles are arranged to be driven in different ways. It is also to be seen that the thread friction-rolls may be positively driven at a predetermined speed with respect to the speed of rotation of the receiving-spindle, so as to insure the taking up of the required amount of doubled and twisted thread by the receiving-bobbin.

While I have shown two thread friction-rolls positively driven by the receiving-spindle, it is to be understood that I may use one or more, as found most convenient for the particular work to be accomplished.

What I claim as my invention is—

1. In combination, delivery-spindles, a receiving-spindle, means for driving them, thread friction-rolls, and a worm and gear connection between the delivery-spindle and each thread friction-roll arranged to directly drive the rolls at a predetermined speed with reference to the speed of the receiving-spindle.

2. In combination, delivery-spindles, a receiving-spindle, its shaft, means for driving them, a worm on the receiving-spindle shaft, thread friction-rolls and gears thereon intermeshing with the said worm whereby the friction-rolls are directly driven at a predetermined speed with respect to the receiving-spindle shaft.

In testimony that I claim the foregoing as my invention I have signed my name, in presence of two witnesses, this 29th day of January, 1904.

DAVID SCHMUTZ.

Witnesses:
FREDK. HAYNES,
HENRY THIEME.